United States Patent
Ju et al.

(10) Patent No.: US 11,645,000 B2
(45) Date of Patent: May 9, 2023

(54) STORAGE DEVICE INCLUDING MEMORY CONTROLLER, AND NON-VOLATILE MEMORY SYSTEM INCLUDING THE SAME AND OPERATING METHOD THEREOF

(71) Applicant: Samsung Electronics Co., Ltd., Suwon-si (KR)

(72) Inventors: Myeongjong Ju, Seongnam-si (KR); Mingon Shin, Uiwang-si (KR); Seungjae Lee, Hwaseong-si (KR); Hwasoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 17/035,925

(22) Filed: Sep. 29, 2020

(65) Prior Publication Data

US 2021/0165599 A1 Jun. 3, 2021

(30) Foreign Application Priority Data

Dec. 3, 2019 (KR) .................. 10-2019-0159365

(51) Int. Cl.
*G06F 21/32* (2013.01)
*G06F 3/06* (2006.01)
*G06F 21/78* (2013.01)

(52) U.S. Cl.
CPC .......... *G06F 3/0655* (2013.01); *G06F 3/0604* (2013.01); *G06F 3/0622* (2013.01);
(Continued)

(58) Field of Classification Search
CPC ...... G06F 3/0655; G06F 21/78; G06F 3/0604; G06F 3/0674; G06F 3/0679;
(Continued)

(56) References Cited

U.S. PATENT DOCUMENTS 7,472,251 B2  12/2008  Sasaki
7,512,720 B2   3/2009  Schultz et al.
(Continued)

FOREIGN PATENT DOCUMENTS

KR  10-1070766 B1  10/2011
KR  10-1662729 B1  10/2016
(Continued)

OTHER PUBLICATIONS

Extended European Search Report dated Apr. 29, 2021 for corresponding EP Patent Application No. 20211497.1.

*Primary Examiner* — Samson B Lemma
(74) *Attorney, Agent, or Firm* — Muir Patent Law, PLLC

(57) ABSTRACT

A storage device is configured to be connected to a host device via a physical cable which includes a power line and a data line. The storage device includes a non-volatile memory, a data path controller configured to temporarily deactivate the data line while power is supplied from the host device via the power line, and a memory controller. The memory controller includes a biometric module configured to receive biometric data and perform user authentication based on the biometric data; a biometric processing circuit configured to change a state of the memory controller, based on a result of the user authentication; and a data processing circuit configured to encrypt and decrypt data. The data path controller is configured to temporarily deactivate the data line in response to the changed state of the memory controller.

20 Claims, 15 Drawing Sheets

(52) U.S. Cl.
CPC .......... *G06F 3/0637* (2013.01); *G06F 3/0674* (2013.01); *G06F 3/0679* (2013.01); *G06F 21/32* (2013.01); *G06F 21/78* (2013.01)

(58) Field of Classification Search
CPC ...... G06F 3/0622; G06F 3/0637; G06F 21/32; G06F 21/79; G06F 3/06
USPC ........................................................ 713/186
See application file for complete search history.

(56) References Cited

U.S. PATENT DOCUMENTS

| | | | |
|---|---|---|---|
| 8,266,330 B2 | 9/2012 | Jung et al. | |
| 8,566,603 B2 | 10/2013 | Cox et al. | |
| 9,525,675 B2* | 12/2016 | Zimmer | ................ H04L 63/123 |
| 2002/0164057 A1* | 11/2002 | Kramer | .................. G06V 10/10 |
| | | | 382/124 |
| 2005/0097338 A1* | 5/2005 | Lee | ......................... G06F 21/80 |
| | | | 713/186 |
| 2005/0182973 A1* | 8/2005 | Funahashi | ............. H04L 63/083 |
| | | | 726/19 |
| 2006/0204047 A1* | 9/2006 | Dave | ........................ G06F 21/79 |
| | | | 340/5.2 |
| 2008/0028146 A1* | 1/2008 | Dan | .......................... G06F 21/85 |
| | | | 711/115 |
| 2008/0052528 A1* | 2/2008 | Poo | .......................... G06F 21/32 |
| | | | 713/186 |
| 2008/0215841 A1* | 9/2008 | Bolotin | ............... G06F 12/1466 |
| | | | 711/E12.091 |
| 2009/0199004 A1* | 8/2009 | Krawczewicz | .... G06K 19/0718 |
| | | | 713/172 |
| 2014/0245093 A1 | 8/2014 | Ma et al. | |
| 2016/0048459 A1 | 2/2016 | Oh et al. | |

FOREIGN PATENT DOCUMENTS

| | | |
|---|---|---|
| KR | 10-1936194 B1 | 4/2019 |
| WO | 2009130538 A2 | 10/2009 |

* cited by examiner

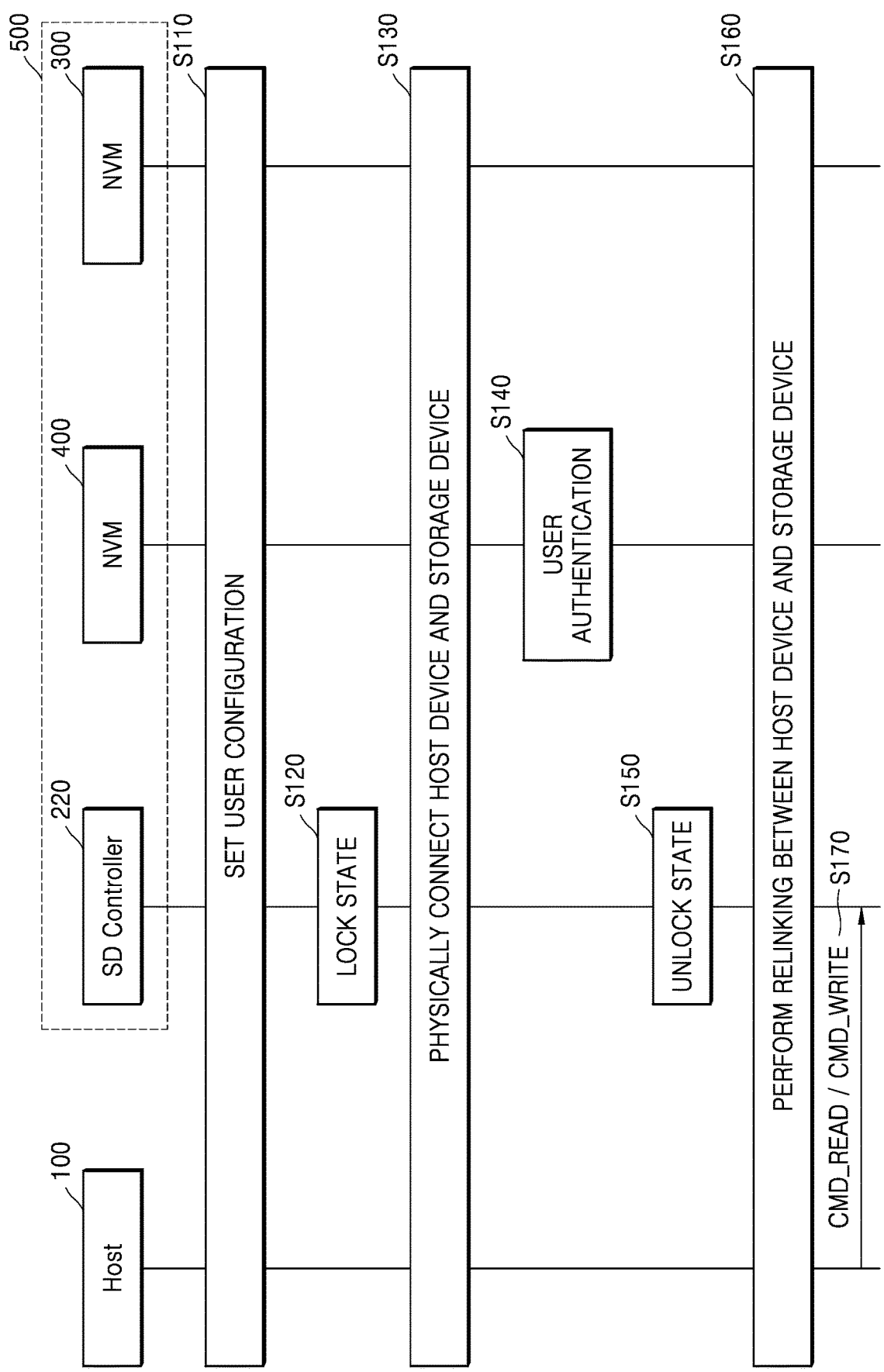

STORAGE DEVICE INCLUDING MEMORY CONTROLLER, AND NON-VOLATILE MEMORY SYSTEM INCLUDING THE SAME AND OPERATING METHOD THEREOF

CROSS-REFERENCE TO RELATED APPLICATION

This application claims the benefit of priority to Korean Patent Application No. 10-2019-0159365, filed on Dec. 3, 2019, in the Korean Intellectual Property Office, the disclosure of which is incorporated herein in its entirety by reference.

BACKGROUND

The inventive concept relates to a semiconductor memory, and more particularly, to a storage device including a memory controller, and a non-volatile memory system including the same and an operating method thereof.

Semiconductor memory devices may be classified into volatile memory devices in which stored data is lost when power is cut off and non-volatile memory devices in which stored data is not lost when power is cut off. The speeds of reading and writing of volatile memory devices are high but data stored therein is lost when an external power supply is cut off. In contrast, the speeds of reading and writing of non-volatile memory devices are lower than those of volatile memory devices but data stored therein is retained even when an external power supply is cut off.

Flash memory, which is one type of non-volatile memory device, has been used in various fields due to the advantages thereof, e.g., a high operating speed, low power consumption, low noise, and high capacity achieved by stacking cells. With the popularization of flash memory, the demand for security technology therefor is increasing.

Self-encrypting drive (SED) among security technologies for flash memory may provide high security protection, whereby data is written in an encrypted format and encrypted data is decrypted and read.

However, storage devices supporting SED are passive devices and may operate in dependence on commands from a host device and thus cannot operate independently when the host device does not support SED. Accordingly, there is a growing need for storage devices capable of operating in various types of host devices.

SUMMARY

Provided are a memory controller, a non-volatile memory system including the same, and an operating method of the non-volatile memory system, in which relinking may be performed independently from a host device.

According to an aspect of the inventive concept, a non-volatile memory system includes a storage device configured to be connected to a host device via a physical cable which includes a power line and a data line. The storage device includes a non-volatile memory, a link controller configured to temporarily deactivate the data line while power is supplied from the host device via the power line, and a memory controller. The memory controller includes a biometric module configured to receive biometric data and perform user authentication based on the biometric data, a biometric processing circuit configured to change a state of the memory controller, based on a result of the user authentication, a relink trigger circuit configured to control the link controller, based on the change of the state of the memory controller, and a data processing circuit configured to encrypt and decrypt data.

According to certain embodiments, a storage device is configured to be connected to a host device via a physical cable which includes a power line and a data line. The storage device includes a non-volatile memory, a data path controller configured to temporarily deactivate the data line while power is supplied from the host device via the power line, and a memory controller. The memory controller includes a biometric module configured to receive biometric data and perform user authentication based on the biometric data; a biometric processing circuit configured to change a state of the memory controller, based on a result of the user authentication; and a data processing circuit configured to encrypt and decrypt data. The data path controller is configured to temporarily deactivate the data line in response to the changed state of the memory controller.

According to certain embodiments, in a non-volatile memory system comprising a storage device configured to be connected to a host device via a physical cable which includes a power line and a data line, wherein the storage device comprises a non-volatile memory, a method includes receiving biometric data and performing user authentication based on the biometric data; changing a state of the memory controller, based on a result of the user authentication; and in response to the changed state, temporarily deactivating the data line while power is supplied from the host device via the power line.

BRIEF DESCRIPTION OF THE DRAWINGS

Embodiments of the inventive concept will be more clearly understood from the following detailed description taken in conjunction with the accompanying drawings in which:

FIG. 2 illustrates the exchange of signals in a non-volatile memory system according to an embodiment the inventive concept;

DETAILED DESCRIPTION OF THE EMBODIMENTS

Hereinafter, various embodiments of the inventive concept will be described in detail with reference to the accompanying drawings.

FIGS. 1A to 1D are block diagrams of non-volatile memory systems according to embodiments of the inventive concept.

Figure 1A:
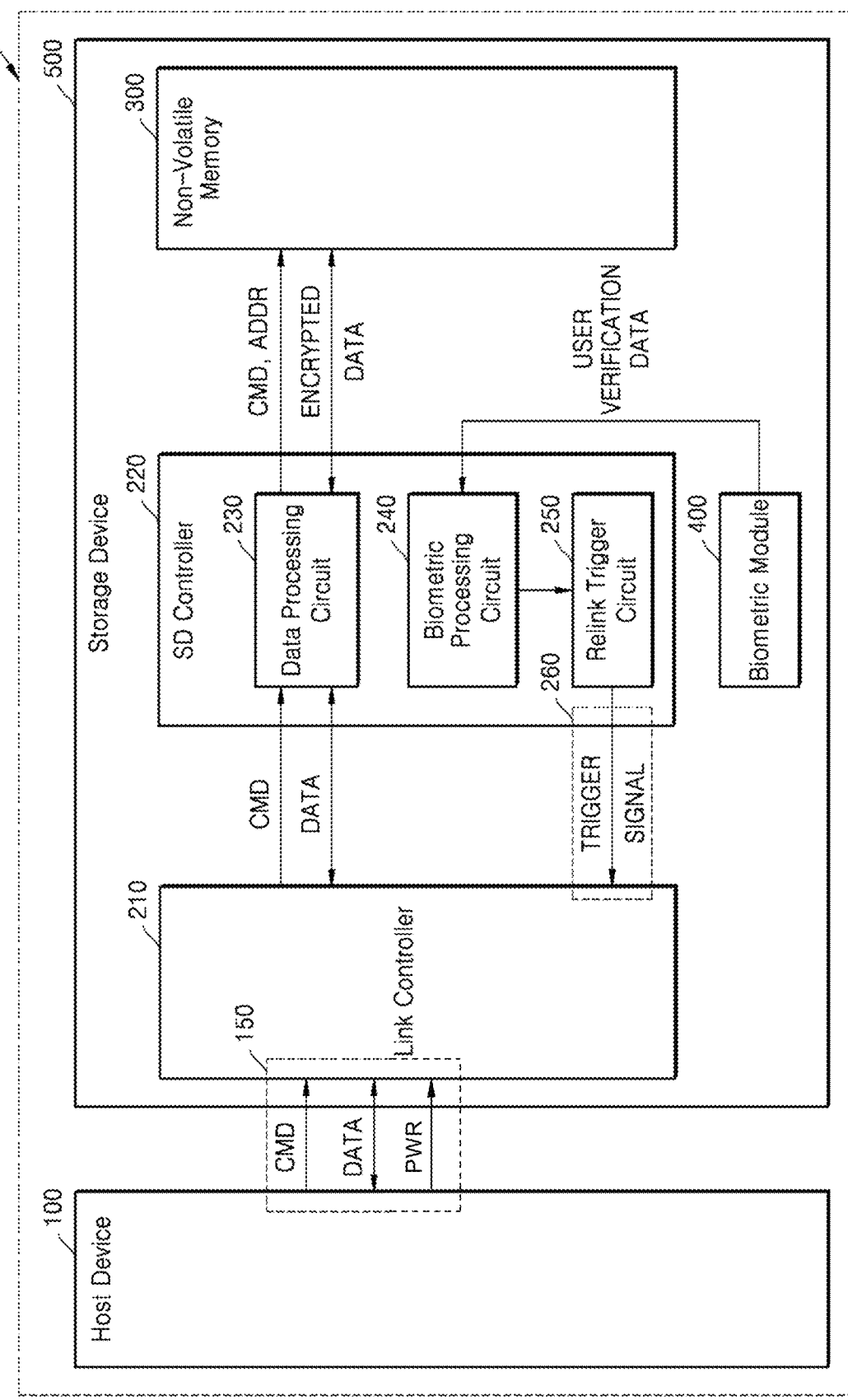
FIGS. 1A to 1D are block diagrams of non-volatile memory systems according to embodiments of the inventive concept.

Referring to FIG. 1A, a non-volatile memory system 10 is provided. The non-volatile memory system 10 may include a host device 100 and a storage device 500.

The storage device 500 may include a link (LINK) controller 210, a storage device (SD) controller 220, a non-volatile memory 300, and a biometric module 400.

The host device 100 may be embodied as, for example, an electronic device such as a personal computer (PC), a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, or an e-book. Alternatively, the host device 100 may be embodied as, for example, an electronic device such as a wearable device, e.g., a wrist watch or a head-mounted display (HMD).

According to various embodiments, the host device 100 may include an interface 150 for transmitting and receiving a command CMD and/or data DATA with the storage device 500 and for providing power PWR to the storage device 200. The interface 150 may include at least one hot-pluggable interface. For example, the interface 150 may include interface protocols such as peripheral component interconnect-express (PCI-E), advanced technology attachment (ATA), serial ATA (SATA), parallel ATA (PATA), or serial attached SCSI (SAS). In addition, various interface protocols, such as universal serial bus (USB), multi-media card (MMC), enhanced small disk interface (ESDI) or integrated drive electronics (IDE), and thunderbolt, are applicable.

According to various embodiments, the storage device 500 may store and output data. The storage device 500 may be an internal memory embedded in an electronic device. For example, the storage device 500 may be an embedded universal flash storage (UFS) memory device, an embedded multi-media card (eMMC), or a solid-state drive (SSD). The storage device 500 may be formed on a substrate formed within the host device 100. In some embodiments, the storage device 500 may be an external memory detachably installed in an electronic device. For example, the storage device 500 may include at least one of a UFS memory card, a compact flash (CF) card, a secure digital (SD) card, a micro-SD card, a mini-SD card, an extreme digital (xD) card and a memory stick.

According to various embodiments, the LINK controller 210 may control a connection between the storage device 500 and the host device 100. When the LINK controller 210 is embodied as including a separate component distinguished from the SD controller 220 (e.g., when it is not on the same die, or semiconductor package as the SC controller 220), the LINK controller 210 may be referred to as a bridge board. The LINK controller 210 may also be referred to as an interface device, or interface circuit, or as a data path controller. Also, the SD controller 220 and LINK controller 210 together may be described simply as a "controller" or "memory controller," whether they are part of a single semiconductor die or device or separate semiconductor dies or devices. The controlling of the connection between the storage device 500 and the host device 100 may refer to activating or deactivating a data path for data transmission and reception during supply of power via a power line. For example, the LINK controller 210 may deactivate a pin to which the data path is connected while a connection to the host device 100 via a USB cable is maintained. For example, while power is received from the host device 100, when the pin corresponding to the data path is deactivated or disabled, the host device 100 may identify that the pin corresponding to the data path is deactivated although the host device 100 has been physically connected to the storage device 500 via the USB cable. Thereafter, the host device 100 may identify the storage device 500 again when the pin corresponding to the data path is activated again by the LINK controller 210. The LINK controller 210 includes a switch (not shown) in the data path and may control a connection between the storage device 500 and the host device 100 by controlling the switch. As another example, the LINK controller 210 may further include a micro-controller (not shown). The LINK controller 210 may temporarily deactivate the data path by resetting or initiating the micro-controller while power is supplied thereto. Accordingly, even when plug-out or physical disconnection does not actually occur between the host device 100 and the storage device 500, relinking may be performed between the host device 100 and the storage device 500.

According to various embodiments, the SD controller 220 may include a data processing circuit 230, a biometric processing circuit 240, and a relink trigger circuit 250.

The data processing circuit 230 may provide various signals to the non-volatile memory 300 and may control operations such as writing and reading. For example, the SD controller 220 may provide a command CMD and an address ADDR to the non-volatile memory 300 to access data stored in a memory cell array.

As another example, the data processing circuit 230 may encrypt data and store the encrypted data in the memory cell array or decrypt encrypted data stored in the memory cell array and output the decrypted data as read data. Because encryption and decryption are performed in a process of storing and outputting data, the stored data may be prevented from leaking even when the storage device 500 is stolen or lost.

The biometric processing circuit 240 may change a state of the SD controller 220 according to a biometric verification result. The biometric processing circuit 240 may receive user verification data from the biometric module 400. The user verification data may represent whether biometric verification performed through the biometric module 400 succeeds or fails. When biometric verification succeeds, the biometric processing circuit 240 may change the state of the SD controller 220 to an unlocked state and transmit a control signal to the relink trigger circuit 250. The control signal may correspond to a signal for controlling the relink trigger circuit 250 to transmit a trigger signal to the LINK controller 210.

The relink trigger circuit 250 may transmit the trigger signal to the LINK controller 210. The trigger signal may be a signal controlling the LINK controller 210 to perform relinking. The relink trigger circuit 250 may transmit the trigger signal to the LINK controller 210 in response to the control signal received from the biometric processing circuit 240. For example, in response to the trigger signal, the LINK controller 210 may deactivate the pin corresponding to the data path, deactivate the switch in the data path, or initialize the micro-controller included in the LINK controller 210.

According to various embodiments, the relink trigger circuit 250 may transmit the trigger signal to the LINK controller 210, based at least on the state of the SD controller 220. For example, when the SD controller 220 is changed from a locked state to the unlocked state, the relink trigger circuit 250 may transmit the trigger signal to the LINK controller 210.

According to various embodiments, the biometric module 400 may compare input biometric data with previously stored biometric data. Here, the biometric data may refer to data used to identify or verify a human, based on his or her physical characteristics. For example, the biometric data may include various data such as fingerprint data, iris data, vein data, voice data, facial feature data, and retinal data.

The biometric module 400 may determine whether a user of the storage device 500 is a true user or not, based on the biometric data. For example, when the storage device 500 is encrypted, the user of the storage device 500 must pass user authentication to access a user data region. Accordingly, the user of the storage device 500 may input biometric data through the biometric module 400 integrated in the storage device 500. The biometric module 400 may compare the input biometric data with previously stored biometric data. The biometric module 400 may transmit user verification data indicating a result of the comparison to the biometric processing circuit 240. When the comparison result indicates a mismatch, the locked state of the storage device 500 is maintained by the biometric processing circuit 240, thereby protecting user data. When the comparison result indicates a match, the state of the storage device 500 is changed to the unlocked state by the biometric processing circuit 240 and thus the user data is accessible.

In one embodiment, the biometric module 400 may be embodied as a fingerprint recognition module. The fingerprint recognition module may be a module that identifies a user by obtaining a digital image of fingerprints distributed on the user's finger. For example, the fingerprint recognition module may be of an optical type, a capacitive type, or an ultrasonic type.

In another embodiment, the biometric module 400 may embodied as a vein recognition module. The vein recognition module may further include an infrared sensor. The vein recognition module may be a module that emits infrared rays into blood vessels and identifies an individual, based on a residual image. For example, the vein recognition module may identify an individual, based on a vein image of at least one of the back or palm of a user's hand and the user's finger.

In another embodiment, the biometric module 400 may be embodied as an iris recognition module. The iris recognition module may be a module for identifying an individual, based on the shape of a user's iris.

Although it is described in the above-described embodiments that the biometric module 400 is based on fingerprints, veins, or an iris, the biometric module 400 is not limited thereto. For example, the user may be identified, based on various biometric data such as the user's gait, face, and voice.

According to various embodiments, the biometric module 400 may transmit user verification data indicating the result of the comparison to the biometric processing circuit 240. The user verification data may be, for example, "1" or a logic high value when the user authentication succeeds and may be, for example, "0" or a logic low value when the user authentication fails. The biometric processing circuit 240 may receive the user verification data from the biometric module 400 and change the SD controller 220 from the locked state to the unlocked state when the user verification data is "1". The SD controller 220 may be changed to the unlocked state by changing pointer information to a normal master boot record (MBR) by the biometric module 400, as will be described with reference to FIGS. 4A and 4B below.

According to various embodiments, the trigger signal may be transmitted through a path different from a path for transmission of the command CMD and the data DATA to the data processing circuit 230. The trigger signal may be transmitted by a communication method that is not dependent on reception of commands. For example, the communication method may correspond to general purpose input output (GPIO) communication.

Figure 1B:
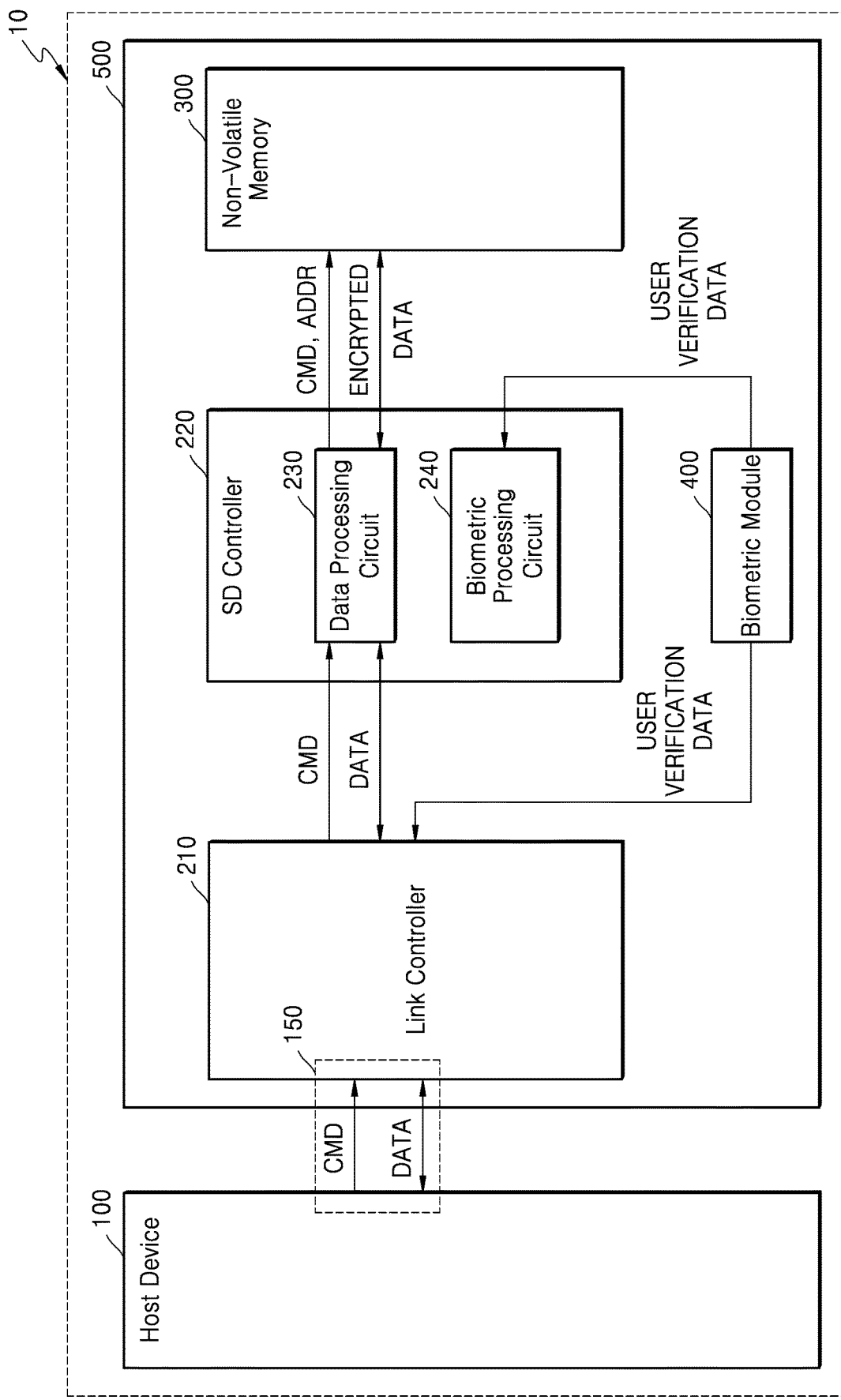

Referring to FIG. 1B, a biometric module 400 may transmit the user verification data to a LINK controller 210, as well as the biometric processing circuit 240, in response to a success of user authentication. According to various embodiments, the LINK controller 210 may be configured to perform relinking when the user verification data is directly received from the biometric module 400, as well as the trigger signal.

However, because points in time when the biometric processing circuit 240 receives the user verification data and changes the state of the SD controller 220 to the unlocked state may not be accurately known, the user verification data may be first transmitted to the biometric processing circuit 240 and thereafter transmitted to the LINK controller 210 after a certain time interval. By transmitting the user verification data at time intervals, the host device 100 may be prevented from being relinked to before the SD controller 220 is unlocked. According to various embodiments, when the biometric module 400 directly transmits the user verification data to the LINK controller 210, the relink trigger circuit 250 may be omitted.

Figure 1C:
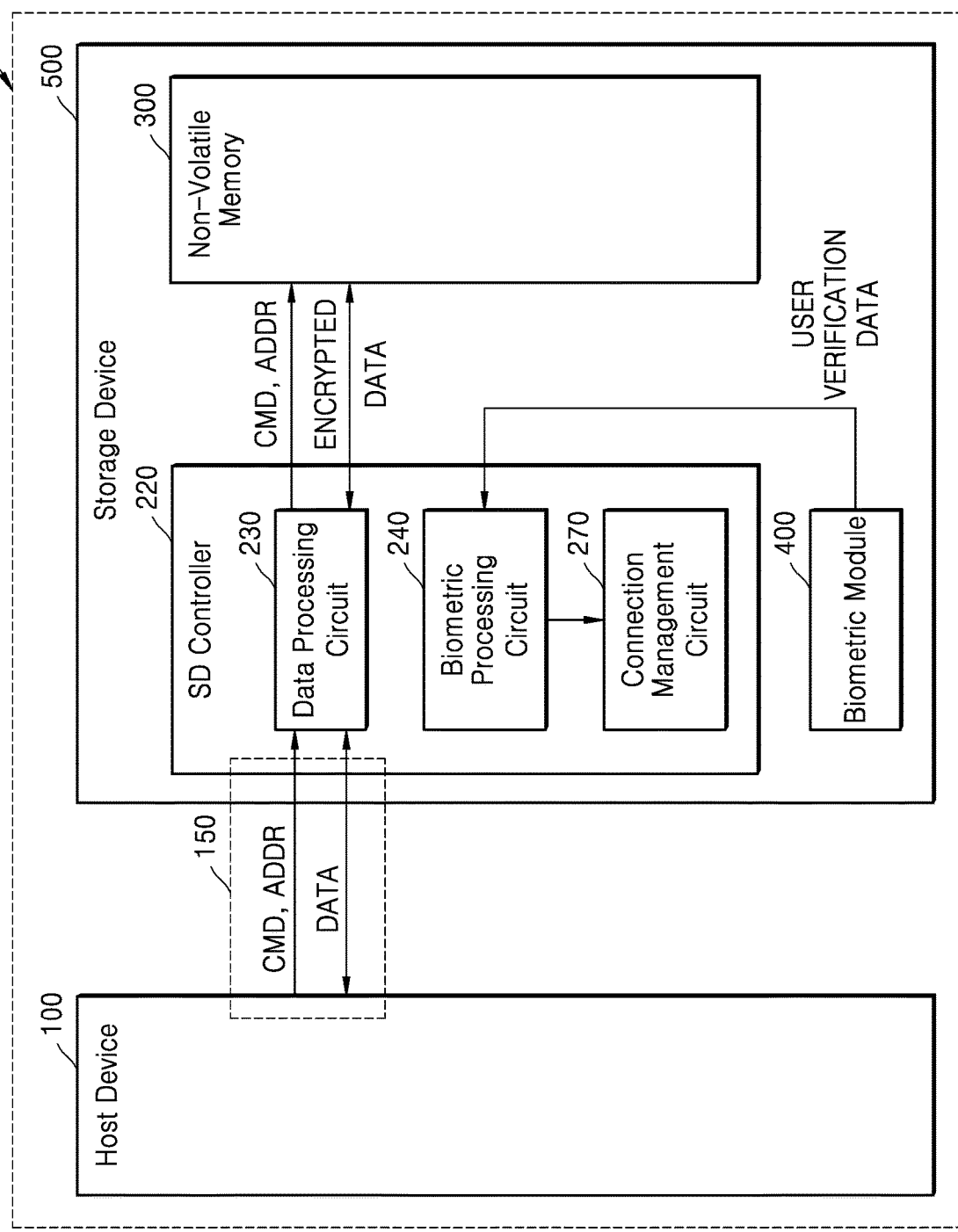

Referring to FIG. 1C, an SD controller 220 may further include a connection management circuit 270. In the cases of FIGS. 1A and 1B, the LINK controller 210 and the SD controller 220 are described as separate controllers distinguishable from each other but are not limited thereto. According to various embodiments, the LINK controller 210 may be integrated into the SD controller 220 (e.g., as part of the same die or semiconductor package). The connection management circuit 270 may be a circuit for controlling connection to the host device 100. The connection management circuit 270 may perform the same operation as or similar operation to those of the LINK controllers 210 of FIGS. 1A and 1B. For example, the connection management circuit 270 may deactivate or disable a pin corresponding to a data path among a plurality of pins of the SD controller 220, deactivate a switch disposed in the data path, or reset or initialize the SD controller 220. Using the connection management circuit 270, the host device 100 may perform relinking to the storage device 500 while maintaining a physical connection with the storage device 500. Referring to FIG. 1C, a biometric processing circuit 240 may receive user verification data from a biometric module 400, and transmit a control signal to the connection management circuit 270 when user authentication succeeds. The control signal may refer to a signal for controlling the connection management circuit 270 to deactivate the pin corresponding to the data path among the plurality of pins of the SD controller 220, deactivate a switch disposed in the data path, or reset the SD controller 220.

Figure 1D:
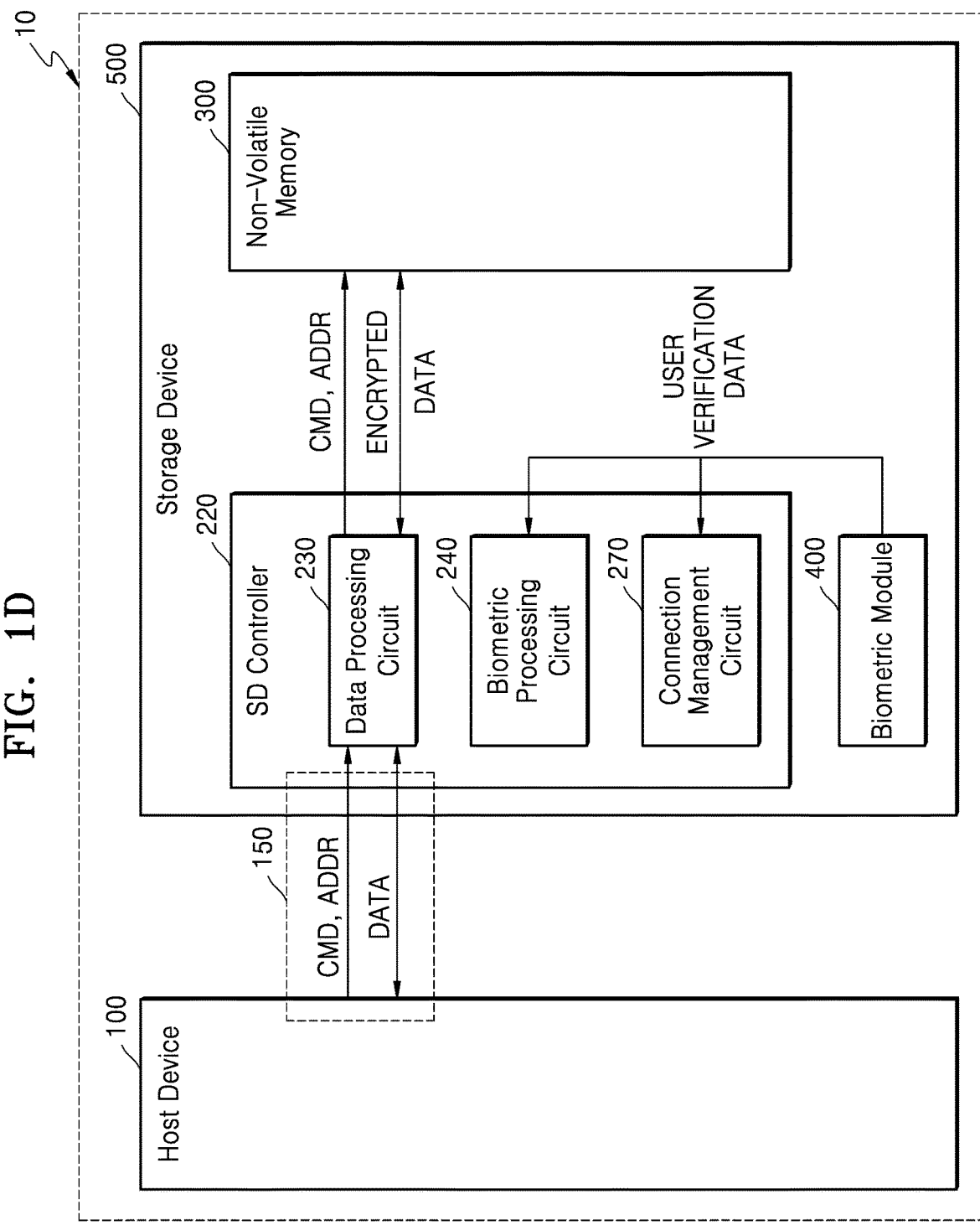

Referring to FIG. 1D, a biometric module 400 may transmit user verification data to both a biometric processing circuit 240 and a connection management circuit 270. For example, the biometric module 400 may change a state of the SD controller 220 to the unlocked state in response to the user verification data, and the connection management circuit 270 may perform relinking to the host device 100 in response to the user verification data. As described above with reference to FIG. 1D, when the biometric module 400 simultaneously transmits the user verification data to the biometric processing circuit 240 and the connection management circuit 270, relinking may be performed before the SD controller 220 is changed to the unlocked state. Accordingly, the biometric module 400 may first transmit the user verification data to the biometric processing circuit 240 at regular time intervals, and transmit the user verification data to the connection management circuit 270 after a certain time interval.

FIG. 2 illustrates the exchange of signals in a non-volatile memory system according to an embodiment the inventive concept.

Referring to FIG. 2, in operation S110, user configuration may be set between a host device 100 and a storage device 500. For example, for data encryption, a user of the storage device 500 may newly set user biometric data in the storage device 500 or change previously set user biometric data. According to various embodiments, the user configuration may be performed by software supporting a self-encrypting drive (SED) function of the storage device 500. Operation S110 will be described in detail with reference to FIG. 7 below.

In operation S120, the SD controller 220 may change a state of the SD controller 220 to the locked state. After completion of the user configuration in operation S110, the user of the storage device 500 may disconnect the storage device 500 and the host device 100 from each other. The SD controller 220 may change the state of the SD controller 220 to the locked state in response to a power cut-off for security of user data. For example, when the user cancels a physical connection with the host device 100, the supply of power from the host device 100 may be cut off. When the supply of power to the storage device 500 is cut off, the SD controller 220 may change the state of the SD controller 220 to the locked state. For example, the SD controller 220 may deactivate access to a user data region by changing pointer information of the SD controller 220.

In operation S130, the host device 100 and the storage device 500 may be physically connected. For example, when both the host device 100 and the storage device 500 support a USB interface, the physical connection may be performed based on a USB cable. When the host device 100 is connected to the storage device 500, the host device 100 may operate the storage device 500 by supplying power thereto via a power line. For example, in the case of a USB type-C interface among USB interfaces, the storage device 500 may be supplied with power from the host device 100 through a VBUS pin.

In operation S140, the biometric module 400 may perform user authentication. The biometric data obtained in operation S110 may be compared with biometric data input by the user, and a comparison result may be output. For example, when a comparison between a previously stored fingerprint image and an input fingerprint image reveals that they are the same, it may be identified that the user authentication succeeded and thus user verification data may be transmitted to the biometric processing circuit 240 of the SD controller 220.

In operation S150, the SD controller 220 may be changed to the unlocked state. The biometric processing circuit 240 may receive user verification data, for example, that is "1" or logic high from the biometric module 400 and change pointer information for the non-volatile memory 300 to activate access to the user data region. A detailed description thereof will be described with reference to FIGS. 4A and 4B below.

In operation S160, relinking may be performed between the host device 100 and the storage device 500. As described above, the relinking does not refer to performing a physical connection again after the physical connection has been canceled. That is, the relinking may refer to temporarily deactivating only a data path while power is continuously supplied in a plug-in state, rather than performing plug-out and plug-in.

In one embodiment, when the storage device 500 includes the LINK controller 210 of FIG. 1A, the relink trigger circuit 250 of the SD controller 220 may transmit a trigger signal 260 to the LINK controller 210. The LINK controller 210 may perform relinking by temporarily disabling a pin corresponding to the data path, temporarily deactivating a switch disposed in the data path, or initializing a microprocessor (not shown), in response to the trigger signal 260. In doing so, from the host's perspective, it appears as if the storage device 500 has been disconnected (communications have been disconnected), so that the host must re-establish communications with the storage device 500. This re-established communication will be made based on the updated settings of the pointer.

In another embodiment, when the storage device 500 is embodied as including one SD controller 220 as illustrated in FIG. 1D, relinking may be performed by controlling the connection management circuit 270. For example, when receiving a control signal from the biometric processing circuit 240 or user verification data directly from the biometric module 400, the connection management circuit 270 may perform relinking by temporarily disabling the pin corresponding to the data path or temporarily deactivating the switch disposed in the data path.

In operation S170, the host device 100 may write and/or read data. Because relinking is performed in operation S160, after the pin or switch has been reactivated or enabled, or the SD controller 220 has been reset or re-initialized, the host device 100 may identify the storage device 500 again. However, the pointer information has been changed in operation S150 and thus the host device 100 may start booting in the user data region and access the user data region. Accordingly, the host device 100 may request user data to be read (CMD_READ) or to be written to the user data region (CMD_WRITE). The above process of changing the pointer and relinking may occur without the need for any command from the host, such as a periodic command to check for the locked/unlocked status of the storage device 500.

Figure 3:
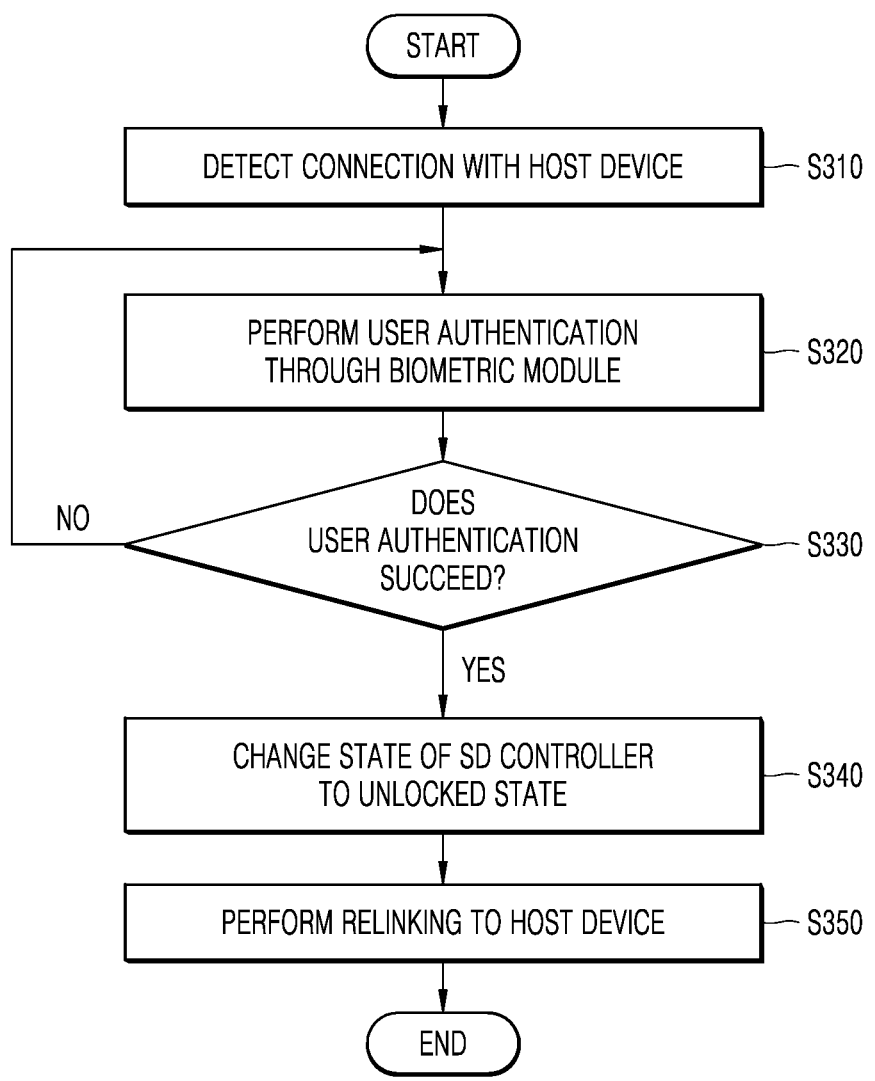
FIG. 3 is a flow chart illustrating an operation of a memory controller according to an embodiment of the inventive concept.

FIG. 3 is a flow chart illustrating an operation of a memory controller according to an embodiment of the inventive concept.

Referring to FIG. 3, the SD controller 220 may detect a connection with the host device 100 (operation S310). The host device 100 and the storage device 500 may be connected according to a commonly supportable interface. For example, when the host device 100 and the storage device 500 each support a USB interface, they may be connected through a USB cable. The storage device 500 may be connected to the host device 100 to receive power and transmit and receive data. According to various embodiments, when the SD controller 220 and the host device 100 are connected, the SD controller 220 may correspond to the locked state. Before the connection is made, power supply may be cut off when the connection between the SD controller 220 and the host device 100 is canceled. The SD controller 220 may change the state thereof to the locked state whenever power supply is cut off.

The biometric module 400 may perform user authentication (operation S320). A user who wants to unlock the storage device 500 may input biometric data through the biometric module 400 in the storage device 500. For example, when the biometric module 400 is embodied as a fingerprint recognition module, the user may input biometric data of a fingerprint shape by touching the fingerprint recognition module with his or her finger. The biometric module 400 may identify whether the input biometric data matches biometric data previously stored through a user registration process (operation S330). For example, when the biometric module is embodied as the fingerprint recognition module, the biometric module 400 may identify whether an input fingerprint image matches a previously stored fingerprint image. As a comparison between these two fingerprint images reveals that they match, the biometric module 400 may determine that user authentication succeeds.

When the previously stored biometric data and the input biometric data do not match, the biometric module 400 may wait until biometric data is received again. When the previously stored biometric data and the input biometric data match, the SD controller 220 may change the state of the SD controller 220 to the unlocked state (operation S340). Specifically, when biometric authentication succeeds, the biometric module 400 may transmit user verification data to the SD controller 220. The biometric processing circuit 240 of the SD controller 220 may change the state of the SD controller 220 to the unlocked state according to the user verification data. The changing of the state of the SD controller 220 to the unlocked state may be achieved by changing pointer information for the non-volatile memory 300 to an operating system (OS) MBR. The SD controller 220 may perform relinking to enable access to the user data region after the state of the SD controller 220 is changed to the unlocked state (operation S350). For example, after the pointer information is changed, the biometric processing circuit 240 may transmit the control signal to the relink trigger circuit 250 or the connection management circuit 270 to control them to perform relinking (e.g., to cause a temporary deactivation or disabling of a pin or switch to appear to the host as if the storage device 500 has been disconnected).

Figure 4A:
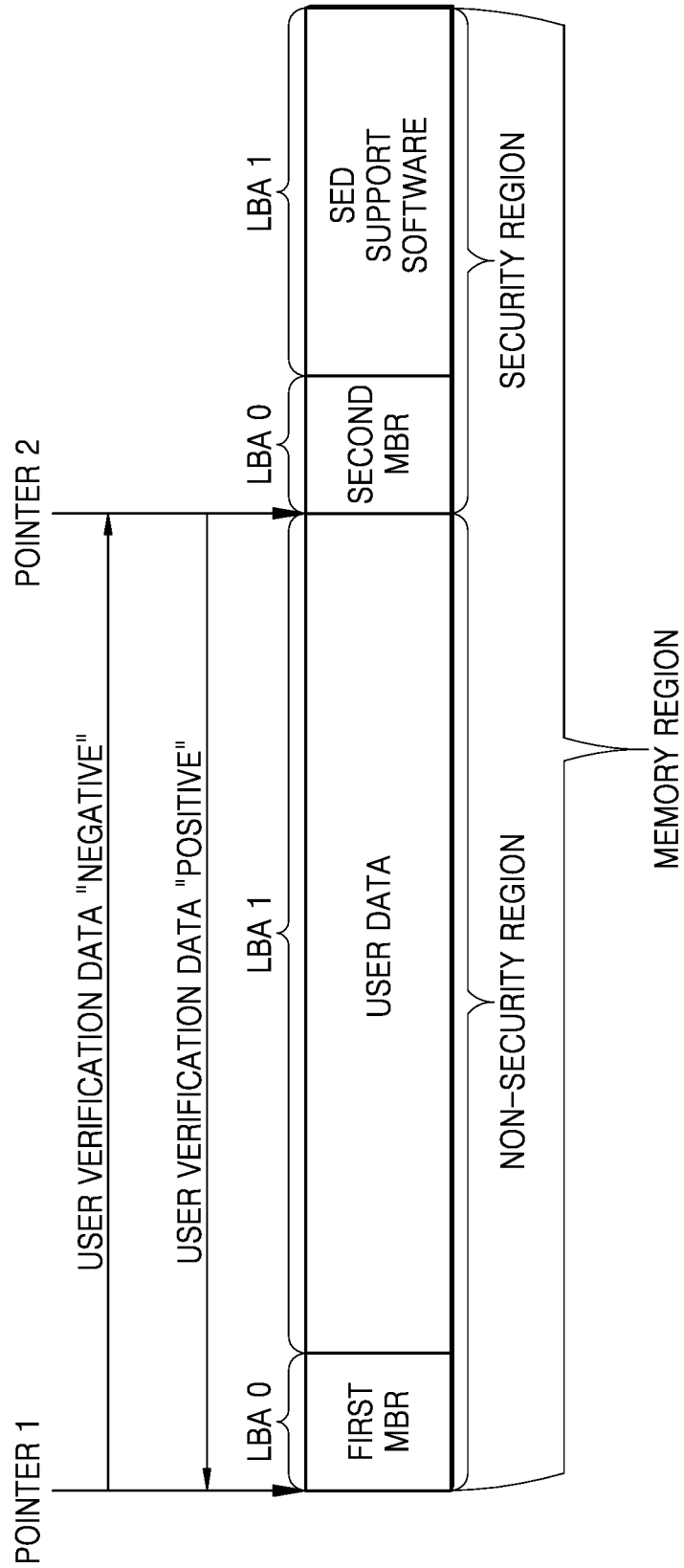
FIG. 4A illustrates a data storage state of a non-volatile memory device according to an embodiment of the inventive concept.
Figure 4B:
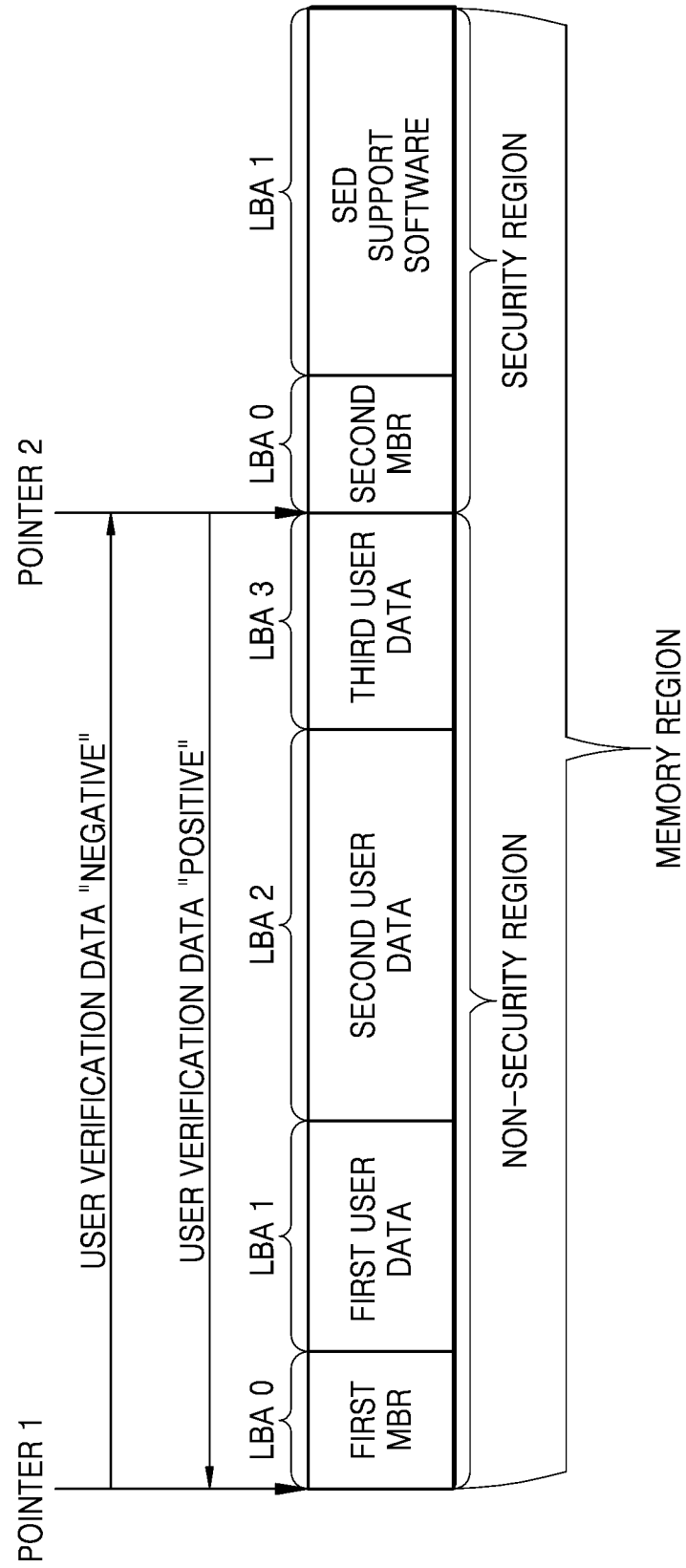
FIG. 4B illustrates another data storage state of a non-volatile memory device according to an embodiment of the inventive concept.

FIGS. 4A and 4B illustrate data storage states of a non-volatile memory device according to an embodiment of the inventive concept.

FIG. 4A illustrates storage spaces of the non-volatile memory 300 according to various embodiments. The storage spaces of the non-volatile memory 300 will be referred to as a memory region. The memory region may include a non-security region and a security region.

The non-security region may include a first master boot record and user data. The non-security region is a region storing the user data, and may be referred to as various terms such as a user volume, a user data region, and a private region. The non-security region may be understood as a memory region accessible in a state in which security for the storage device 500 is disabled (a non-security state).

An MBR may include information including a location of a partition, boot code for booting, and the like. The first MBR may be referred to as an operating system MBR. For example, when an operating system of the host device 100 is Windows, the first MBR may be an MBR loader. As another example, when the operating system of the host device 100 is Linux, the first MBR may be LInux LOader (LILO) or Rand Unified Boot loader (GRUB). An LBA scheme (logical block addressing scheme) may be a scheme for specifying a location of a data block in the memory region. For example, a first data block may correspond to LBA (logical block address) 0 and a second data block may correspond to LBA 1. Therefore, it may be understood that the first MBR is stored in an LBA 0 region. LBA 1 is a region storing user data, and LBA 0 may store MBR data.

According to various embodiments, the security region may include a second MBR and a region storing SED support software. The security region may be understood as a memory region accessible in a state in which the security of the storage device 500 is maintained.

The second MBR may be referred to as various terms such as a shadow MBR and a fake MBR. The second MBR may correspond to an MBR for forcing the host device 100 to start booting in a region irrelevant to the user data when the security for the storage device 500 is not canceled and thus access to the non-security region should not be allowed. According to various embodiments, firmware files may be stored in the LBA 1 region of the security region. This is to induce the installation of software that enables users to disable security.

According to various embodiments, the biometric processing circuit 240 may activate a pointer 1. The pointer 1 may be activated when the biometric processing circuit 240 receives user verification data indicating that biometric authentication has succeeded from the biometric module 400. When the pointer 1 is activated, the host device 100 may be connected to the storage device 500 and start booting using the first MBR in the non-security region. When booting is started using the first MBR, the host device 100 may access the region storing the user data.

According to various embodiments, the biometric processing circuit 240 may activate a pointer 2. The pointer 2 may be activated when the biometric processing circuit 240 receives user verification data indicating that biometric authentication has failed from the biometric module 400. When the pointer 2 is activated, the host device 100 may be connected to the storage device 500 and start booting using the second MBR of the security region. When booting is started using the second MBR, the region storing the user data is not visible to the host device 100 and only the region storing the SED support software is accessible by the host device 100. Though the region that stores user data is referred to herein as a non-security region, it is in effect, a secure region. That is, when user verification fails, the region storing the user data cannot be accessed, and in this sense it is a secure region.

FIG. 4B illustrates a case where a storage region is used by a plurality of users, according to various embodiments. An LBA 1 region may be a region storing data of a first user, an LBA 2 region may be region storing data of a second user, and an LBA 3 region may be a region storing data of a third user. When receiving biometric data, the biometric module 400 may compare the biometric data with previously stored biometric data to determine whether they match. For example, it may be assumed that the first user corresponds to first biometric data, the second user corresponds to second biometric data, and the third user corresponds to third biometric data. In this case, the biometric module 400 may compare the received biometric data with all the first to the third biometric data. When the received biometric data does not match any of the first biometric data to third biometric data, security for the storage device 500 may be maintained. When the received biometric data matches any one of the first biometric data to the third biometric data, the biometric processing circuit 240 may refer to a start address of a user data region of partition information in the first MBR, which corresponds to the matching biometric data. For example, when the second biometric data and user input match, the biometric processing circuit 240 may identify a start address of the LBA 2 region, based on the partition information in the first MBR. In this case, the LBA 1 region for the first user or the LBA 3 region for the third user may be invisible to the host device 100. This is because only an address of the LBA 1 region referenced using the partition information of the first MBR is accessible by the host device 100.

Figure 5:
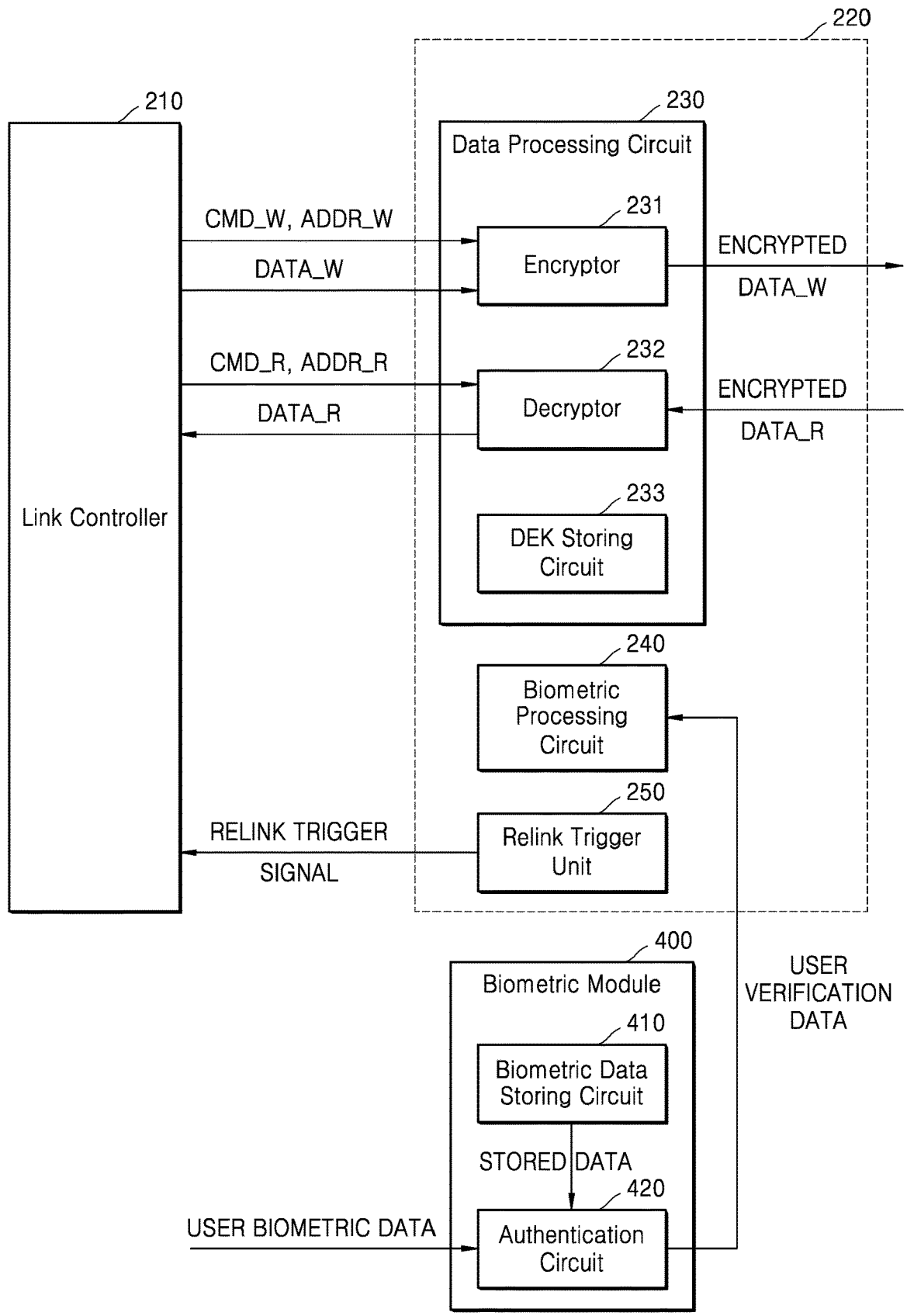
FIG. 5 is a block diagram of a storage device according to an embodiment of the inventive concept.

FIG. 5 is a block diagram of a storage device according to an embodiment of the inventive concept.

The storage device 500 in which the LINK controller 210 and the SD controller 220 are provided separately will be described below. However, the inventive concept is not limited thereto and is also applicable to the storage device 500 embodied only with the SD controller 220 as illustrated in FIGS. 1C and 1D.

Referring to FIG. 5, a data processing circuit 230 may include an encryptor 231, a decryptor 232, and a data encrypting key (DEK) storing circuit 233.

The encryptor 231 may encrypt write data DATA_W. In one embodiment, when the SD controller 220 is in the locked state, a write command CMD_W may be transmitted to the encryptor 231. In this case, the SD controller 220 cannot access the non-security region of the non-volatile memory 300 and thus data writing may not be performed. When the SD controller 220 is in the unlocked state, the write command CMD_W may be transmitted. In the unlocked state, the encryptor 231 may access the non-security region and thus may execute the write command CMD_W. The encryptor 231 may not directly store the write data DATA_W in a designated address ADDR but may encrypt the write data DATA_W. The encryptor 231 may perform encryption using a DEK requested and received from the DEK storing circuit 233. After the encryption is completed, the encryptor 231 may store encrypted write data ENCRYPTED DATA_W in a designated address ADDR W.

The decryptor 232 may decrypt encrypted read data ENCRYPTED DATA_R. In one embodiment, when the SD controller 220 is in the locked state, a read command CMD_R may be transmitted to the decryptor 232. In this case, the SD controller 220 cannot access the non-security region of the non-volatile memory 300 and thus data reading may not be performed. When the SD controller 220 is in the unlocked state, the read command CMD_R may be transmitted to the decryptor 232. In the unlocked state, the decryptor 232 may access the non-security region and thus execute the read command CMD_R. The decryptor 232 may read data stored in a designated address ADDR_R. The read data may be encrypted read data ENCRYPTED DATA_R. The decryptor 232 may perform decrypting using a DEK received from the DEK storing circuit 233. After the decryption is completed, the decryptor 232 may output decrypted read data DATA_R to the host device 100 by transmitting the decrypted read data DATA_R to the LINK controller 210.

The DEK storing circuit 233 may store key values used to encrypt and decrypt data. In one embodiment, the DEK may be a unique value for the storage device 500. For example, the DEK may be generated based on a global unique identifier (GUID) of the storage device 500.

In the above-described embodiment, the biometric data received through the biometric module 400 is used for user authentication and the DEK is described above as the unique value for the storage device 500, but embodiments are not limited thereto.

According to various embodiments, the DEK may be additionally encrypted, based on previously stored biometric data. In this case, the biometric data may be not only used by the biometric module 400 to authenticate but also be used to obtain the DEK. When the DEK is additionally encrypted, it is possible to prevent an external intruder (e.g., a hacker) from decrypting user data by obtaining only the DEK.

According to various embodiments, the biometric module 400 may include a biometric data storing circuit 410 and an authentication circuit 420. The biometric data storing circuit 410 may store biometric data that is input during a user registration process. The user registration process may be performed using software supporting an SED function as described with reference to FIG. 7 below. The biometric data storing circuit 410 may transmit stored biometric data to the authentication circuit 420 in response to biometric data input to the biometric module 400.

The authentication circuit 420 may perform data comparison for user authentication. For example, the authentication circuit 420 may compare the input biometric data with the biometric data stored in the biometric data storage circuit 410. When the input biometric data and the biometric data stored in the biometric data storage circuit 410 do not match, "0" or logic low data may be output as an authentication result. When the input biometric data and the biometric data stored in the biometric data storage circuit 410 match, "1" or logic high data may be output as an authentication result. The authentication result may correspond to user verification data illustrated in FIGS. 1A to 1D.

Figure 6:
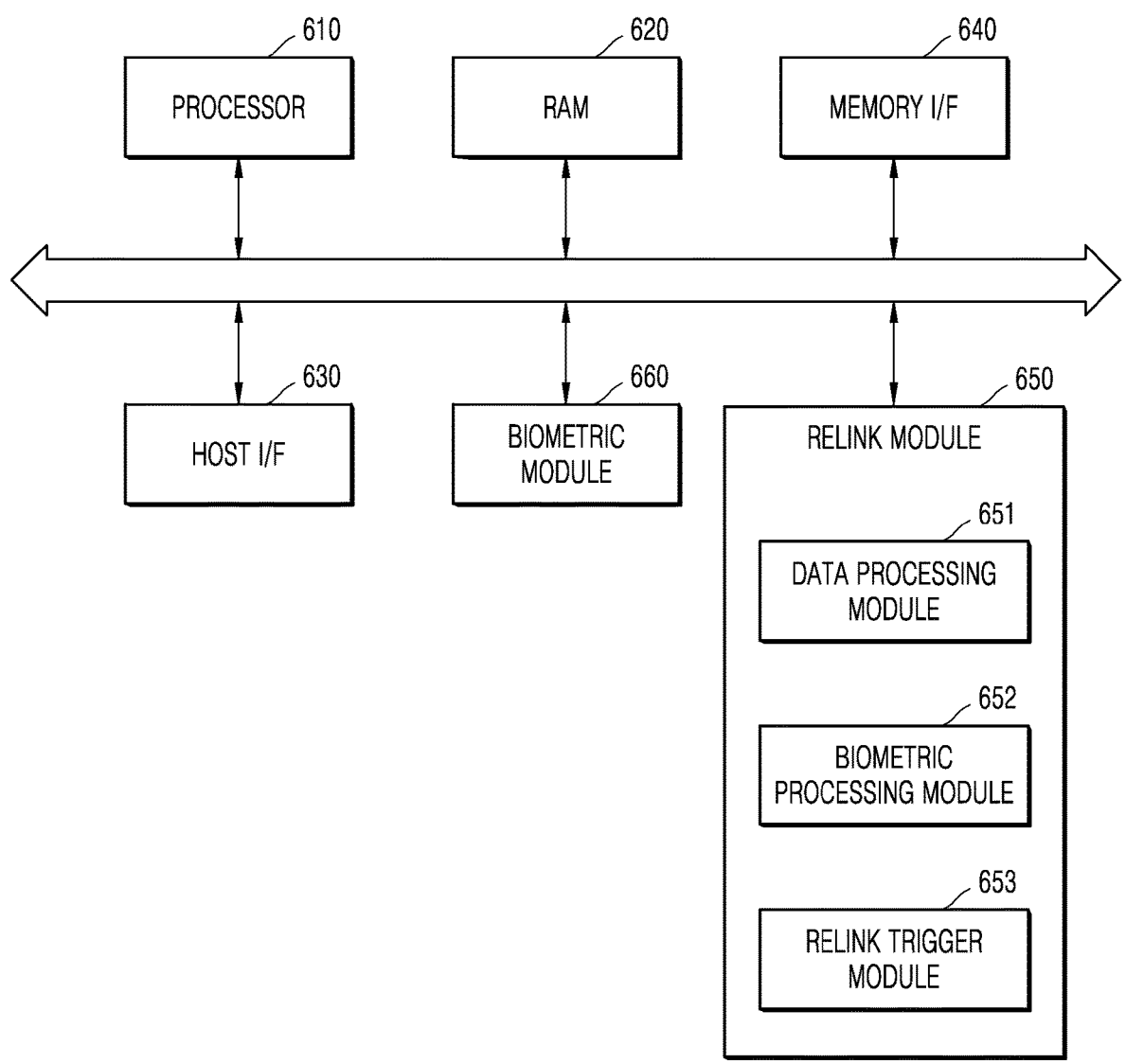
FIG. 6 illustrates an interface between a host device and a storage device according to an embodiment of the inventive concept.

FIG. 6 illustrates an interface between a host device and a storage device according to an embodiment of the inventive concept.

Referring to FIG. 6, the SD controller 220 may include a processor 610, random access memory (RAM) 620, a host interface 630, a memory interface 640, a biometric module 660, and a relink module 650.

The processor 610 may include a central processing unit (CPU) or a microprocessor, and control overall operations of the SD controller 220. For example, the processor 610 may be configured to drive software or firmware for controlling the SD controller 220, and the software or firmware may be driven by being loaded in the RAM 620. The RAM 620 may be used as an operating memory, a cache memory, or a buffer memory of the processor 610. In the RAM 620, write data to be written to a memory device may be temporarily stored and read data read from the memory device may be temporarily stored.

The host interface 630 interfaces with the host device 100 to receive a request for a memory operation from the host device 100. In addition, the memory interface 640 may provide an interface between the SD controller 220 and a memory device (not shown). For example, write data may be transmitted to and read data may be received from the memory device through the memory interface 640. In addition, the memory interface 640 may provide commands and addresses to the memory device, and receive various information from the memory device and provide the information to the SD controller 220.

In one embodiment, the relink module 650 and the biometric module 660 may perform various relink-related operations according to the above-described embodiments, based on a software method, and the relink module 650 may include a data processing module 651, a biometric processing module 652, and a relink trigger module 653. When operations according to embodiments of the inventive concept are performed based on a software method, each of the biometric module 660, the data processing module 651, the biometric processing module 652, and the relink trigger module 653 may include programs executable by the processor 610, and the programs may be loaded into the RAM 620 and executed by the processor 610. Accordingly, the biometric module 660 and the relink module 650, including data processing module 651, biometric processing module 652, and relink trigger module 653 may be implemented using various software (e.g., computer program code) for execution by a processor. In some cases parts of the biometric module 660 or the relink module 650, including data processing module 651, biometric processing module 652 may be implemented with a combination of software, hardware, and/or firmware.

Figure 7:
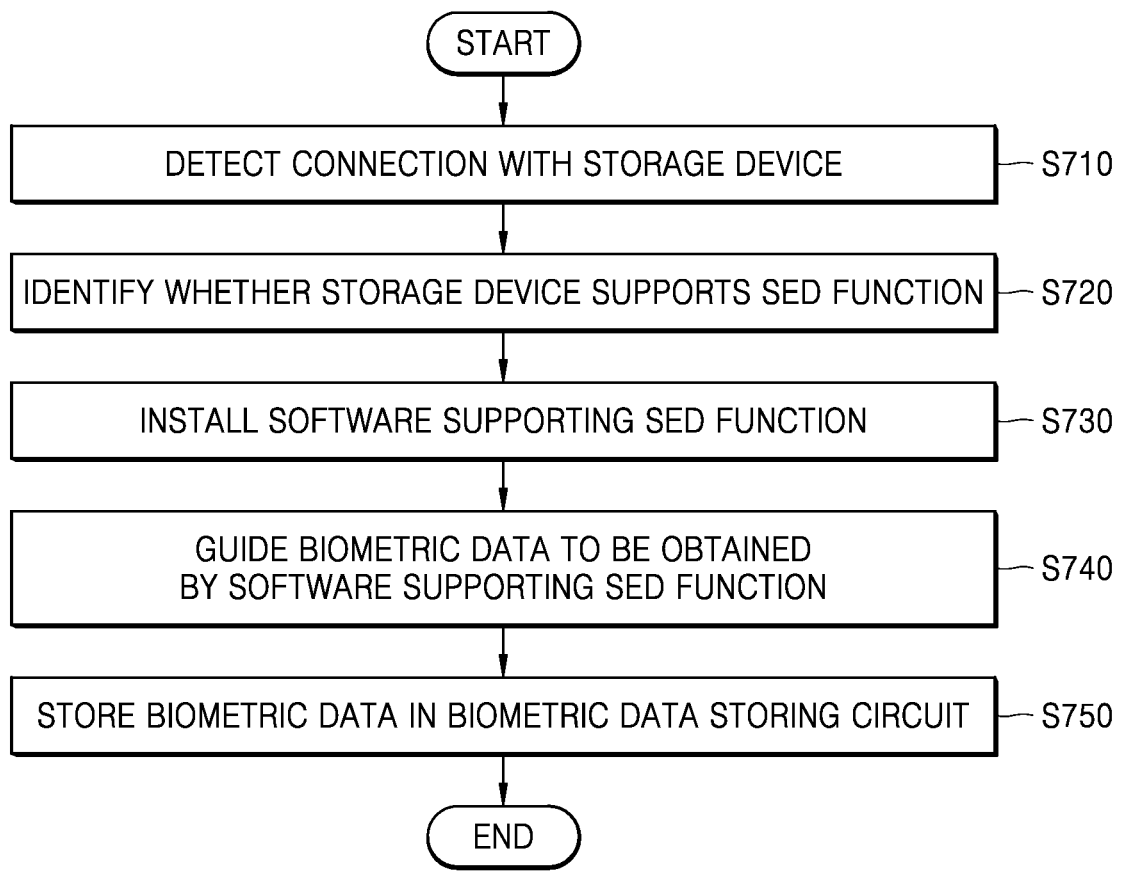
FIG. 7 is a flow chart illustrating an operation of a host device according to an embodiment of the inventive concept.

FIG. 7 is a flow chart illustrating an operation of a host device according to an embodiment of the inventive concept.

Referring to FIG. 7, the host device 100 may detect a connection with the storage device 500 (operation S710). Operation S710 may be described with reference to the above description of operation S130 of FIG. 2 and operation S310 of FIG. 3. The host device 100 may identify that the storage device 500 supports the SED function (operation S720). For example, the host device 100 may receive configuration information for the storage device 500 and check whether the SED function is supported through an identifier indicating whether SED is supported.

According to various embodiments, when the storage device 500 supports SED, communication may be established based on a Trusted Computing Group (TCG) protocol. The TCG protocol is a communication protocol supporting SED, and relates to a method of changing a partition method, a locked state, and an unlocked state of a user region in the storage device 500. For example, when the storage device 500 supports SED, shadow MBR (SMBR) may be generated based on the TCG protocol.

The host device 100 may install software that supports the SED function (operation S730). In one embodiment, the host device 100 may identify whether the storage device 500 supports the SED function but may display a pop-up window suggesting that the software be installed or allow an installation file of the software to be automatically executed when the SED function of the storage device 500 is disabled. The host device 100 may guide biometric data to be obtained by the software that supports the SED function (operation S740). When the software is executed, the host device 100 may request the biometric module 400 of the storage device 500 to input biometric data for activating the SED function. The guiding of the biometric data to be obtained may be based on at least one of a visual guide including the pop-up window and an audio guide including a voice output. The storage device 500 may store the input biometric data in the biometric data storing circuit 410 (operation S750). Because the input biometric data does not need to be transmitted to the host device 100, the storage device 500 may be unlocked by simply inputting the biometric data through the biometric module 400 of the storage device 500 after the SED function is activated through the user registration process, even when the software is not installed in the host device 100 or the host device 100 is not connected to the storage device 500.

It is described in the above-described embodiments that the biometric data input in the user registration process is not being transmitted to the host device 100 but embodiments are not limited thereto. According to various embodiments, the host device 100 may further include a separate biometric module differentiated from the biometric module 400 of the storage device 500. For example, the separate biometric module is a separate device and may be connected through an input/output interface of the host device 100 or may be integrated and embedded into the host device 100. When there is a biometric module connected to the host device 100, the host device 100 may request the storage device 500 to provide the biometric data. Alternatively, the host device 100 may obtain biometric data from a user through a biometric module connected to the host device 100 and transmit the obtained biometric data to the storage device 500. Alternatively, the host device 100 may store biometric data received from the storage device 500 and use the biometric data for user authentication. For example, the host device 100 may identify connection of the storage device 500 including the biometric module 400 thereto and automatically execute the software to request biometric data. When a user inputs biometric data through the biometric module 400 of the storage device 500 in response to the request, the host device 100 may perform user authentication by comparing the biometric data with previously stored biometric data and transmit a result of the user authentication to the storage device 500 or may simply transmit biometric data input through the separate biometric module to the storage device 400 so that user authentication may be performed by the storage device 500.

Figure 8:
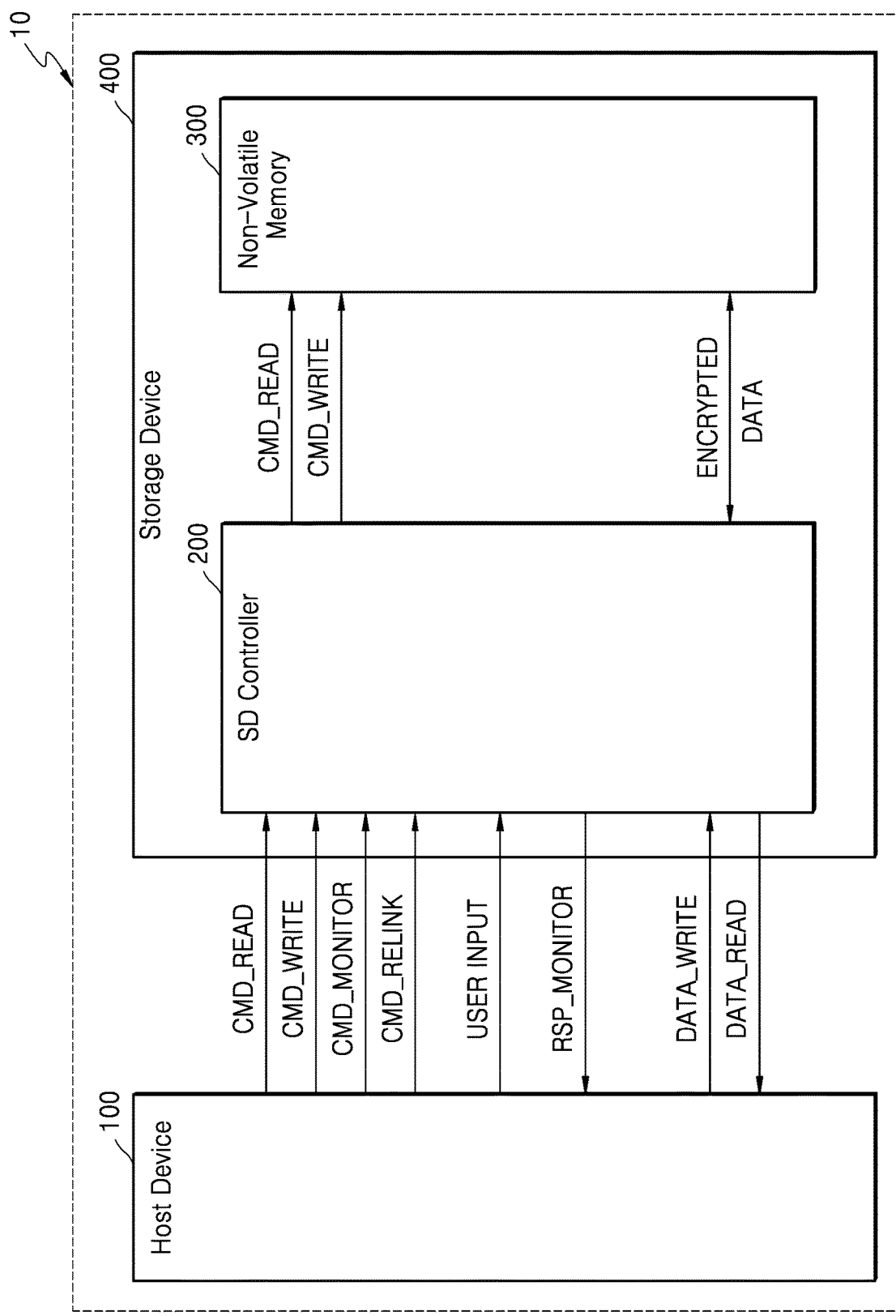
FIG. 8 is a block diagram of a non-volatile memory system.
Figure 9:
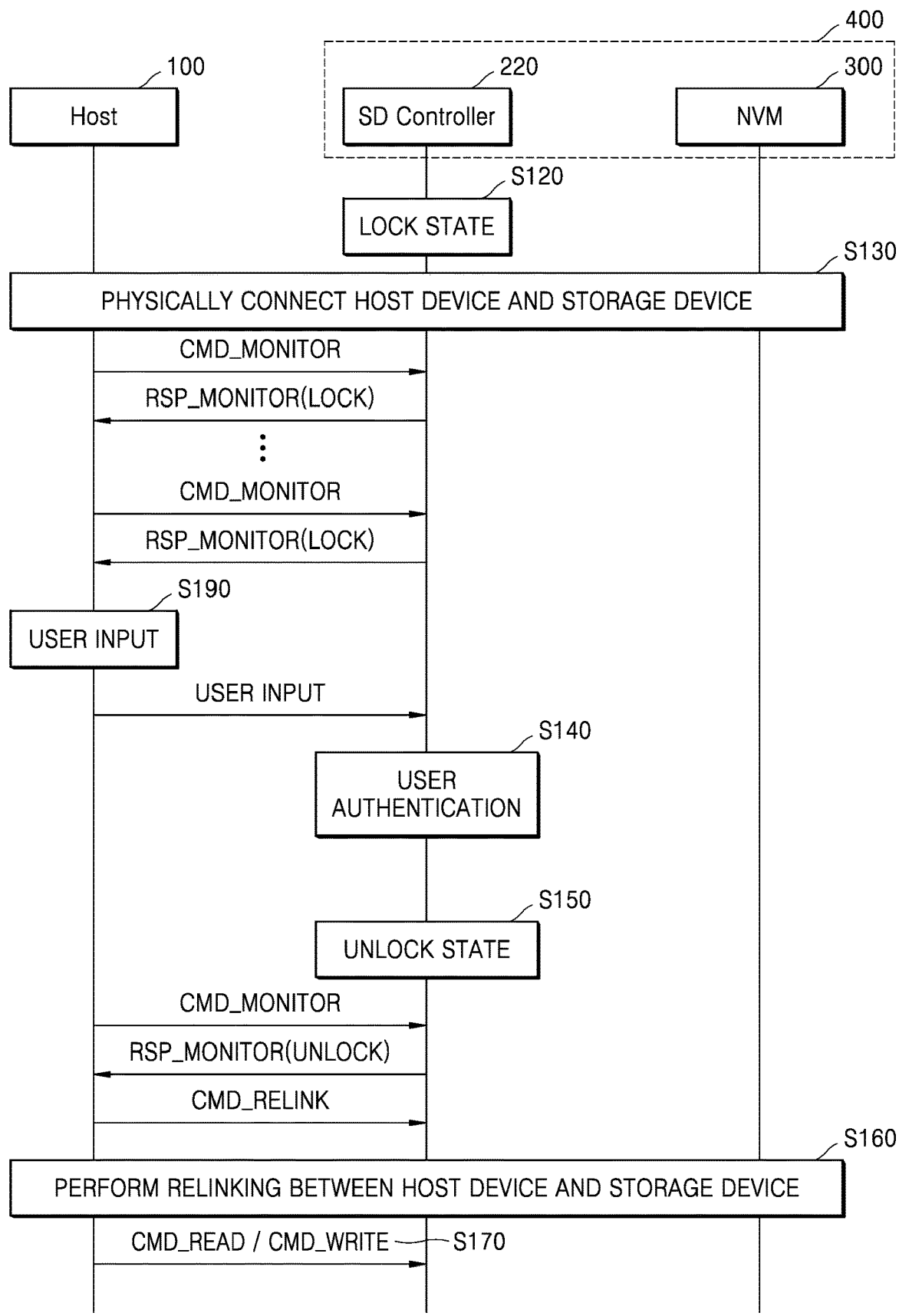
FIG. 9 illustrates the exchange of signals in a non-volatile memory system.

FIG. 8 is a block diagram of a non-volatile memory system. A description about a part of FIG. 8 that is the same as that of FIGS. 1A-1D may be omitted here. FIGS. 8 and 9 are examples described to contrast certain features described previously with a system that may not include these features.

Referring to FIG. 8, a host device 100 may transmit a command CMD_MONITOR for identifying a state of an SD controller 220. The SD controller 220 of FIG. 8 may not include the LINK controller 210 of FIGS. 1A-1D or the connection management circuit 250 of FIG. 2. The SD controller 220 of FIG. 8 may be subject to a command received from the outside (e.g., the host device 100). The host device 100 may periodically transmit a CMD_MONITOR signal to the SD controller 220. For example, when a state of the SD controller 220 is changed from the locked state to the unlocked state, a user data region may be accessible according to a changed pointer 1 by performing relinking. However, the SD controller 220 and a non-volatile memory 300 are passive devices and thus it may be necessary to periodically check whether the state of the SD controller 220 has changed. The passive devices are devices capable of transmitting a response to a command only when they receive the command and thus may include devices that cannot independently transmit a signal first.

In some embodiments, the SD controller 220 transmits a response signal in response to the CMD_MONITOR signal that is periodically received. For example, in some embodiments, the host device 100 cannot identify a point in time when the SD controller 220 is unlocked and thus periodically transmits the CMD_MONITOR signal to the SD controller 220 until a RSP_MONITOR signal, which is a response signal indicating the unlock status is received. Therefore, in this embodiment, the SD controller 220 transmits the RSP_MONITOR signal to the host device 100 in response to the CMD_MONITOR signal that is periodically transmitted. The CMD_MONITOR signal and the RSP_MONITOR signal that are periodically transmitted and received may act as loads on the host device 100 and the SD controller 220, respectively, thereby degrading the performance of the entire memory system.

In some embodiments, the host device 100 may transmit a signal requesting the SD controller 220 to perform relinking. For example, a response signal indicating the unlocked state may be received while the host device 100 periodically performs monitoring. The host device 100 needs to perform relinking to access the user data region according to a changed pointer. Therefore, the host device 100 may transmit a command instructing the SD controller 220 to perform relinking. When the host device 100 transmits a CMD_RELINK signal each time, a delay may occur when the SD controller 220 that is in the unlocked state accesses the non-volatile memory 300. This is because, even when the SD controller 220 is changed to the unlocked state, the host device 100 transmits a subsequent CMD_MONITOR signal and identifies that the SD controller is in the locked state until the SD controller 220 transmits the RSP_MONITOR signal in response to the CMD_MONITOR signal. In addition, because the host device 100 needs to transmit the CMD_RELINK signal again after receiving the RSP_MONITOR signal and thus a delay corresponding to a time required to transmit the CMD_RELINK signal may additionally occur.

FIG. 9 illustrates the exchange of signals in a non-volatile memory system. A description about part of FIG. 9 that is the same as that of FIG. 2 will be omitted here.

Referring to FIG. 9, a host device 100 transmits a monitoring signal CMD_MONITOR at regular intervals to check whether the SD controller 220 is in the locked state. An SD controller 220 should transmit a response signal RSP_MONITOR indicating a state thereof in response to the monitoring signal CMD_MONITOR received at regular intervals.

In operation S190, a user input instructing to unlock the SD controller 220 may be input only through the host device 100. This is because the storage device 500 does not include the biometric module 400, unlike in FIGS. 1A and 1B. Accordingly, the unlocking of the storage device 400 may be subject to the host device 100.

Although the SD controller 220 is changed to the unlocked state in operation S160, the host device 100 may identify that the SD controller 220 is in the locked state. Thereafter, a change in the state of the SD controller 220 may be identified at a point in time when a RSP_MONITOR (UNLOCK) signal is received as a response signal to a CMD_MONITOR signal that is periodically transmitted. Accordingly, a time delay may occur from a point in time when the SD controller 220 is actually unlocked to a point in time when the host device 100 identifies the unlocked state of the SD controller 220.

In addition, in order to identify a user data region, the host device 100 needs to transmit a command requesting to perform relinking. Relinking may be delayed by a time required to transmit the CMD_RELINK signal and a time required for the SD controller 220 to receive the CMD_RELINK signal and to start relinking.

Effects of certain aspects of the inventive concept will be understood by referring to FIGS. 8 and 9 together with the embodiments of FIGS. 1A and 2, and comparing the differences.

Figure 10:
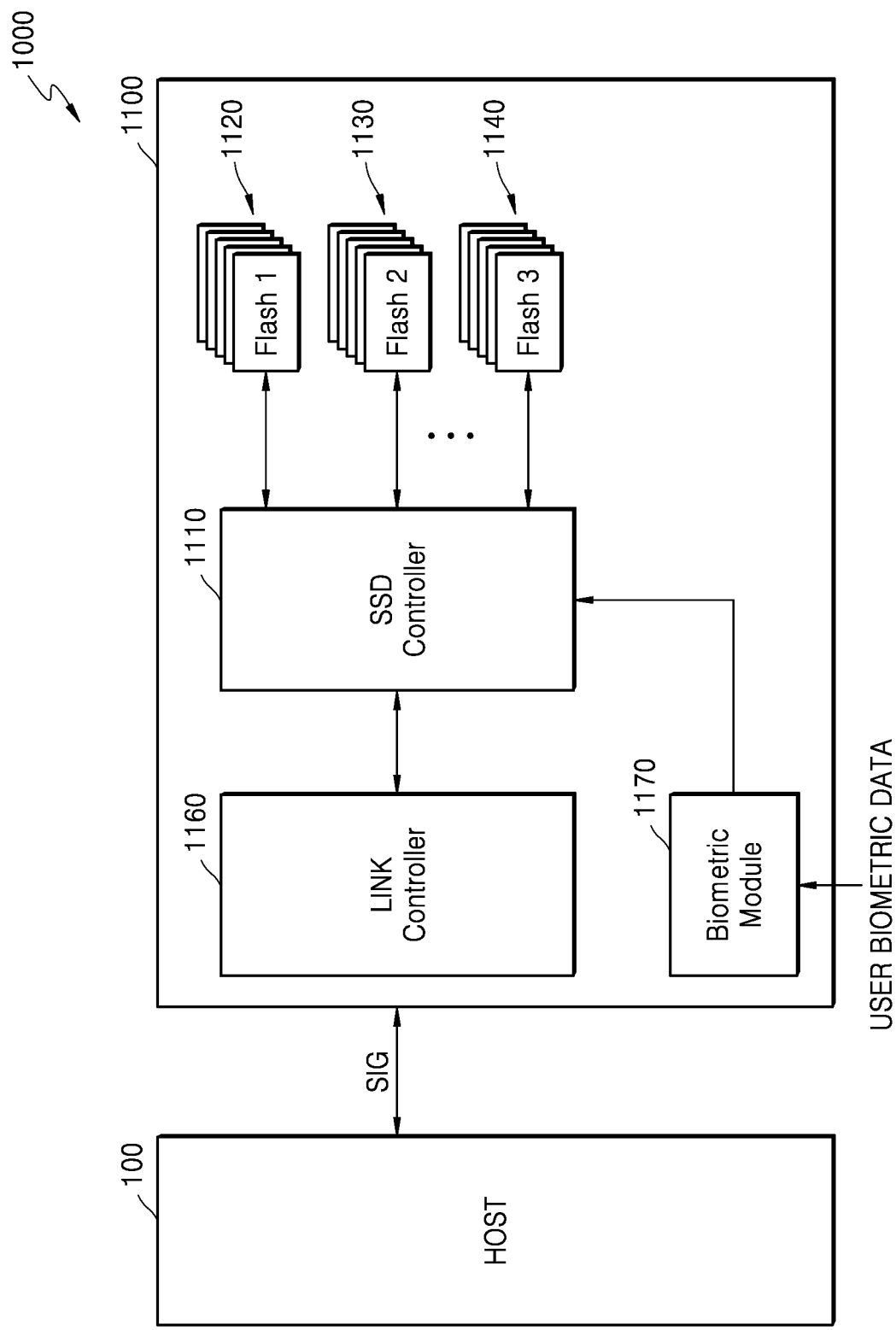
FIG. 10 is a block diagram illustrating an example of applying a memory device to a solid-state drive (SSD) system, according to an embodiment of the inventive concept.

FIG. 10 is a block diagram illustrating an example of applying a memory device to a solid-state drive (SSD) system, according to an embodiment of the inventive concept.

Referring to FIG. 10, an SSD system 1000 may include a host device 100 and an SSD 1100. The SSD 1100 exchanges signals with the host device 100 through a signal connector and is supplied with power through a power connector. The SSD 1100 may include an SSD controller 1110, a plurality of memory devices 1120 to 1140, a LINK controller 1160, and a biometric module 1170. In this case, the SSD controller 1110, the LINK controller 1160, and the biometric module 1170 may be implemented using the embodiments illustrated in FIGS. 1A to 7. Accordingly, the SSD 1100 does not perform relinking depending on a command from the host device 100 but may independently perform relinking even when no command is received from the host device 100. In addition, the SSD 1100 does not receive a monitoring command from the host device 100 and thus does not need to transmit a response signal in response to the monitoring command, thereby reducing load on the memory system. In addition, the SSD 1100 does not receive the monitoring command or a command instructing relinking from the host device 100 and thus is capable of independently performing relinking even based on a protocol or an operating system that does not support the monitoring command or the command instructing relinking. For example, the dependency of the SSD 1100 on the host device 100 or the operating system of the host device 100 may be reduced and the SSD 1100 is applicable to n various types of host devices. In addition, when the locked state of the SSD 1100 is canceled, the SSD 1100 independently performs relinking and thus relinking may be quickly performed without causing a time delay to transmit and receive the monitoring command and the command instructing relinking.

Memory devices according to embodiments of the inventive concept may be mounted in or are applicable to not only the SSD 1100 but also memory card systems, computing systems, UFSs, and the like. An operating method of a memory device according to an embodiment of the inventive concept is applicable to various types of electronic systems in which non-volatile memory is mounted.

Figure 11:
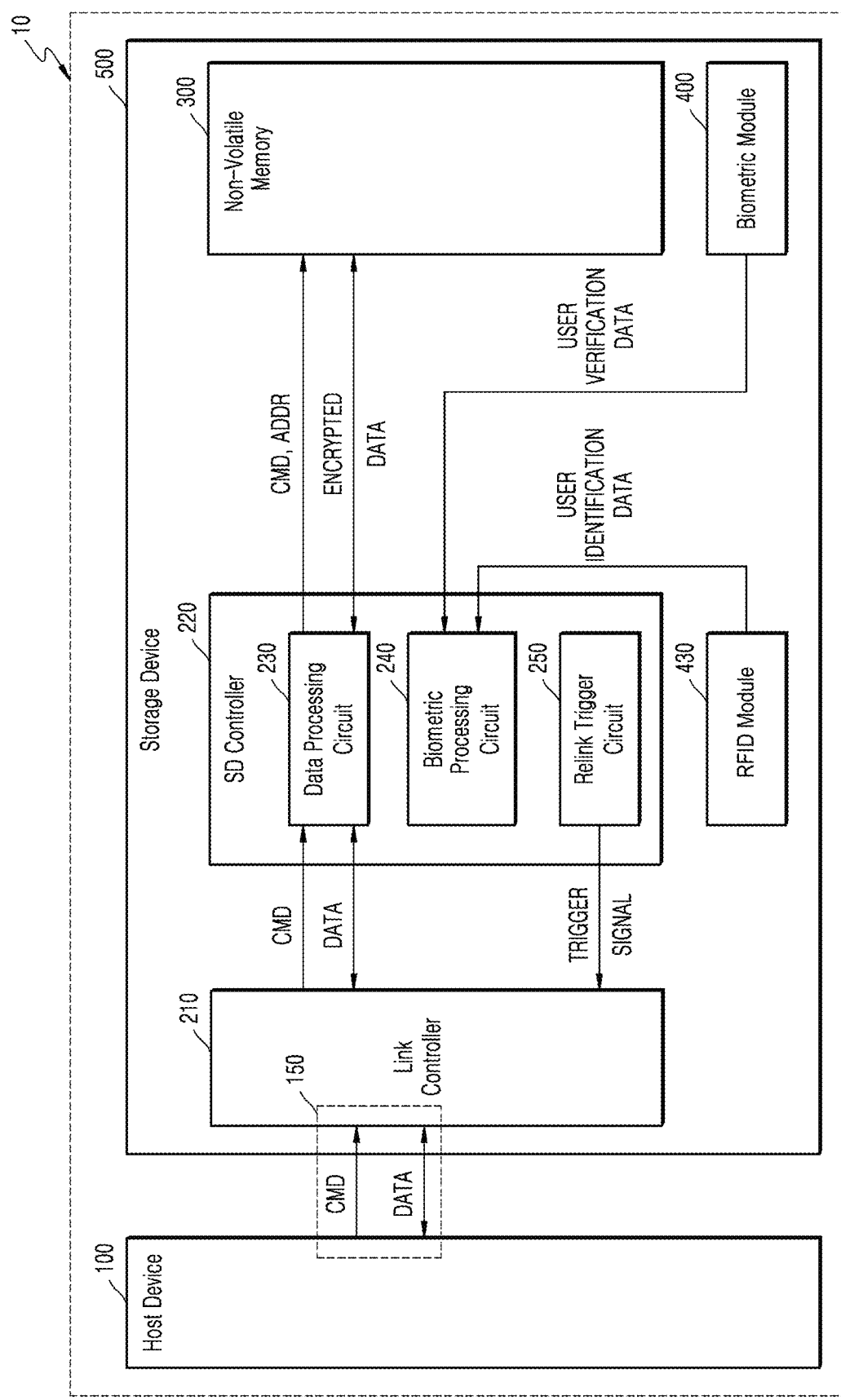
FIG. 11 is a block diagram of a non-volatile memory system according to an embodiment of the inventive concept.

FIG. 11 is a block diagram of a storage device according to an embodiment of the inventive concept. A description of a part of FIG. 11 that is the same as that of FIG. 1A may be omitted here.

Referring to FIG. 11, the storage device 500 may further include a radio-frequency identification (RFID) module 430. The RFID module 430 may refer to a module for exchanging data between an RFID tag device and an RFID reader device by using radio frequency. According to various embodiments, the RFID module 430 may be embodied as a near-field communication (NFC) module and/or a magnetic security transfer (MST) module.

According to various embodiments, a user may have an external device (not shown) distinguished from the host device 100. Examples of the external device may include devices, such as smart phones, which are capable of performing biometric authentication and establishing wireless communication. The user may perform biometric authentication using the external device. The external device includes a biometric module and thus may complete user authentication based on input biometric data. The external device may transmit user verification data to the NFC module or to the storage device 500 through the NFC module or the MST module, in response to the success of the user authentication. In this case, the external device may be manipulated by the user to be positioned within a predetermined distance from the storage device 500. For example, the MST module may transmit user verification data indicating whether or not user authentication has succeeded, together with a unique identifier of the external device, through a magnetic field. The storage device 500 may receive the user verification data through the RFID module 430 and be unlocked when the user verification data is "1"

or logic high. According to the above-described embodiments, a user may unlock the storage device 500 by using not only the biometric module 400 of the storage device 500 but also his or her existing external device without intervention of the host device 100.

While the inventive concept has been particularly shown and described with reference to embodiments thereof, it will be understood that various changes in form and details may be made therein without departing from the spirit and scope of the following claims.

What is claimed is:

1. A non-volatile memory system comprising a storage device configured to be connected to a host device via a physical cable which includes a power line and a data line,
wherein the storage device comprises:
a non-volatile memory;
a link controller configured to temporarily deactivate the data line while power is supplied from the host device via the power line by disabling a pin corresponding to a data path, temporarily deactivating a switch disposed in the data path, or resetting or initiating a microcontroller, so that it appears to the host device as if the storage device has been disconnected; and
a memory controller,
wherein the memory controller comprises: a biometric module configured to receive biometric data and perform user authentication based on the biometric data; a biometric processing circuit configured to change a state of the memory controller, based on a result of the user authentication; a relink trigger circuit configured to control the link controller, based on the change of the state of the memory controller; and a data processing circuit configured to encrypt and decrypt data.

2. The non-volatile memory system of claim 1, wherein the state of the memory controller corresponds to a locked state or an unlocked state, and
the non-volatile memory comprises: a first region accessible by the host device during the unlocked state and inaccessible by the host device during the locked state; and a second region accessible by the host device during the locked state.

3. The non-volatile memory system of claim 2, wherein the memory controller is configured to change the state of the memory controller to the locked state when the storage device is powered off, and
wherein the biometric module completes user authentication and transmits user verification data indicating a result of the user authentication to the biometric processing circuit when input biometric data and previously stored biometric data match.

4. The non-volatile memory system of claim 2, wherein the biometric processing circuit is configured to change the state of the memory controller to the locked state by changing pointer information such that master boot record (MBR) information indicates a second MBR included in the second region, and is configured to change the state of the memory controller to the unlocked state by changing the pointer information such that the MBR information indicates a first MBR included in the first region,
wherein the first MBR corresponds to an operating system (OS) MBR, and
the second MBR corresponds to a shadow MBR (SMBR).

5. The non-volatile memory system of claim 1, wherein the physical cable corresponds to a cable for an interface capable of supporting hot plug, and
the interface corresponds to at least one of a universal serial bus (USB) interface, a serial ATA (SATA) interface, a parallel ATA (PATA) interface, a small computer system interface (SCSI), and a serial attached SCSI (SAS).

6. The non-volatile memory system of claim 1, wherein the biometric processing circuit is configured to change the state of the memory controller from a locked state to an unlocked state in response to success of the user authentication and is configured to transmit a control signal to the relink trigger circuit in response to completion of the changing from the locked state to the unlocked state, and
the relink trigger circuit is configured to transmit a relink trigger signal to the link controller in response to reception of the control signal.

7. The non-volatile memory system of claim 6, configured such that the link controller receives the relink trigger signal without receiving a command from the host device instructing the link controller to perform relinking, and
the link controller is configured to temporarily deactivate the data line during activation of the power line in response to the reception of the relink trigger signal.

8. The non-volatile memory system of claim 1, wherein the link controller and the memory controller are formed on the same semiconductor substrate.

9. The non-volatile memory system of claim 1, wherein the biometric data comprises at least one of an image of a user's fingerprint, an image of the user's iris, an image of the user's vein, and data of the user's voice.

10. The non-volatile memory system of claim 1, wherein the host device bypasses transmission of a monitoring command for identifying the state of the memory controller and a command instructing to perform relinking in response to the change of the state of the memory controller to an unlocked state.

11. The non-volatile memory system of claim 1, further comprising:
a host device configured to send commands and data to the storage device through the physical cable and configured to supply power to the storage device through the physical cable.

12. A storage device configured to be connected to a host device via a physical cable which includes a power line and a data line, the storage device comprising:
a non-volatile memory;
a data path controller configured to temporarily deactivate the data line while power is supplied from the host device via the power line; and
a memory controller,
wherein the memory controller comprises: a biometric module configured to receive biometric data and perform user authentication based on the biometric data; a biometric processing circuit configured to change a state of the memory controller, based on a result of the user authentication; and a data processing circuit configured to encrypt and decrypt data,
wherein the data path controller is configured to temporarily deactivate the data line in response to the changed state of the memory controller by disabling a pin corresponding to the data path, temporarily deactivating a switch disposed in the data path, or resetting or initiating a micro-controller.

13. The storage device of claim 12, wherein the state of the memory controller corresponds to a locked state or an unlocked state, and
the non-volatile memory comprises: a first region accessible by the host device during the unlocked state and inaccessible by the host device during the locked state; and a second region accessible by the host device during the locked state.

14. The storage device of claim 13, wherein the memory controller is configured to change the state of the memory controller to the locked state when the storage device is powered off, and
wherein the biometric module completes user authentication and transmits user verification data indicating a result of the user authentication to the biometric processing circuit when input biometric data and previously stored biometric data match.

15. The storage device of claim 13, wherein the biometric processing circuit is configured to change the state of the memory controller to the locked state by changing pointer information such that master boot record (MBR) information indicates a second MBR included in the second region, and is configured to change the state of the memory controller to the unlocked state by changing the pointer information such that the MBR information indicates a first MBR included in the first region,
wherein the first MBR corresponds to an operating system (OS) MBR, and
the second MBR corresponds to a shadow MBR (SMBR).

16. The storage device of claim 12, wherein the physical cable corresponds to a cable for an interface capable of supporting hot plug, and
the interface corresponds to at least one of a universal serial bus (USB) interface, a serial ATA (SATA) interface, a parallel ATA (PATA) interface, a small computer system interface (SCSI), and a serial attached SCSI (SAS).

17. The storage device of claim 12, configured such that the data path controller receives a signal to temporarily deactivate the data line without receiving a command from the host device instructing the data path controller to perform relinking.

18. A method in a non-volatile memory system comprising a storage device configured to be connected to a host device via a physical cable which includes a power line and a data line, wherein the storage device comprises a non-volatile memory, the method comprising:
receiving biometric data and performing user authentication based on the biometric data;
changing a state of a memory controller, based on a result of the user authentication; and
in response to the changed state, temporarily deactivating the data line while power is supplied from the host device via the power line by disabling a pin corresponding to a data path, temporarily deactivating a switch disposed in the data path, or resetting or initiating a micro-controller.

19. The method of claim 18, wherein:
changing the state of the memory controller comprises: changing between a locked state and an unlocked state;
the non-volatile memory comprises: a first region accessible by the host device during the unlocked state and inaccessible by the host device during the locked state; and a second region accessible by the host device during the locked state.

20. The method of claim 19, further comprising:
changing the state of the memory controller to the locked state by changing pointer information such that master boot record (MBR) information indicates a second MBR included in the second region; and
changing the state of the memory controller to the unlocked state by changing the pointer information such that the MBR information indicates a first MBR included in the first region,
wherein the first MBR corresponds to an operating system (OS) MBR, and
the second MBR corresponds to a shadow MBR (SMBR).

* * * * *